(12) United States Patent
Baby et al.

(10) Patent No.: US 10,862,316 B2
(45) Date of Patent: Dec. 8, 2020

(54) BALANCED CHARGE AND DISCHARGE CONTROL FOR ASYMMETRIC DUAL BATTERY SYSTEM

(71) Applicant: INTEL CORPORATION, Santa Clara, CA (US)

(72) Inventors: Anil Baby, Bangalore (IN); Anoop Parchuru, Bangalore (IN); Shobhit Chahar, Bangalore (IN); Govindaraj G, Bangalore (IN); Vinaya Kumar Chandrasekhara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 16/147,609

(22) Filed: Sep. 29, 2018

(65) Prior Publication Data

US 2019/0081487 A1  Mar. 14, 2019

(51) Int. Cl.
*H02J 7/00* (2006.01)
*G06F 1/16* (2006.01)
*G06F 1/26* (2006.01)

(52) U.S. Cl.
CPC .......... *H02J 7/0016* (2013.01); *G06F 1/1616* (2013.01); *G06F 1/1635* (2013.01); *G06F 1/1647* (2013.01); *G06F 1/1683* (2013.01); *G06F 1/26* (2013.01); *H02J 7/0014* (2013.01); *H02J 7/0021* (2013.01)

(58) Field of Classification Search
CPC .... G06F 1/1616; G06F 1/1635; G06F 1/1647; G06F 1/1683; G06F 1/26; H02J 11/00; H02J 7/00047; H02J 7/0014; H02J 7/0016; H02J 7/0021

USPC .......................................................... 307/25
See application file for complete search history.

(56) References Cited

U.S. PATENT DOCUMENTS

| | | | | |
|---|---|---|---|---|
| 5,821,734 A | * | 10/1998 | Faulk | H02J 2207/20 320/124 |
| 5,929,606 A | * | 7/1999 | Faulk | H01M 10/46 320/143 |
| 8,896,315 B1 | * | 11/2014 | Davies | H02J 7/0016 324/434 |
| 2013/0257354 A1 | | 10/2013 | Koyama | |
| 2014/0176045 A1 | * | 6/2014 | Naskali | H01M 10/441 320/103 |
| 2015/0130700 A1 | * | 5/2015 | Chen | G04R 60/12 345/156 |

(Continued)

OTHER PUBLICATIONS

European Search Report for Related European Patent Application Serial No. EP 19 18 3065, with a completion date of Jan. 23, 2020, 2 pages.

*Primary Examiner* — Daniel Kessie
*Assistant Examiner* — Brian K Baxter
(74) *Attorney, Agent, or Firm* — Green, Howard & Mughal LLP

(57) ABSTRACT

In some examples, a system includes a primary side with a charger and a first battery and a secondary side with a second battery. The charger on the primary side can charge both the first battery and the second battery. A hinge resistance is between the primary side and the secondary side. The primary side includes a feedback controlled active device in a current path of the first battery that compensates for the hinge resistance, for connector resistances, or for battery impedances in a current path of the second battery.

22 Claims, 11 Drawing Sheets

(56) References Cited

U.S. PATENT DOCUMENTS

| | | | |
|---|---|---|---|
| 2016/0380315 A1* | 12/2016 | Weicker | H02J 7/34 |
| | | | 320/136 |
| 2016/0380441 A1* | 12/2016 | Groat | H02J 7/022 |
| | | | 320/107 |
| 2018/0219389 A1* | 8/2018 | Binder | H02J 1/108 |

* cited by examiner

200

500

600

700

BALANCED CHARGE AND DISCHARGE CONTROL FOR ASYMMETRIC DUAL BATTERY SYSTEM

TECHNICAL FIELD

This disclosure relates generally to balanced charge and discharge control for an asymmetric dual battery system.

BACKGROUND

Dual display converged mobility devices are increasingly used in mobile computing. Use of a device with dual display may require batteries on either side of the device in order to achieve battery life required to power both displays.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DETAILED DESCRIPTION

Figure 1:
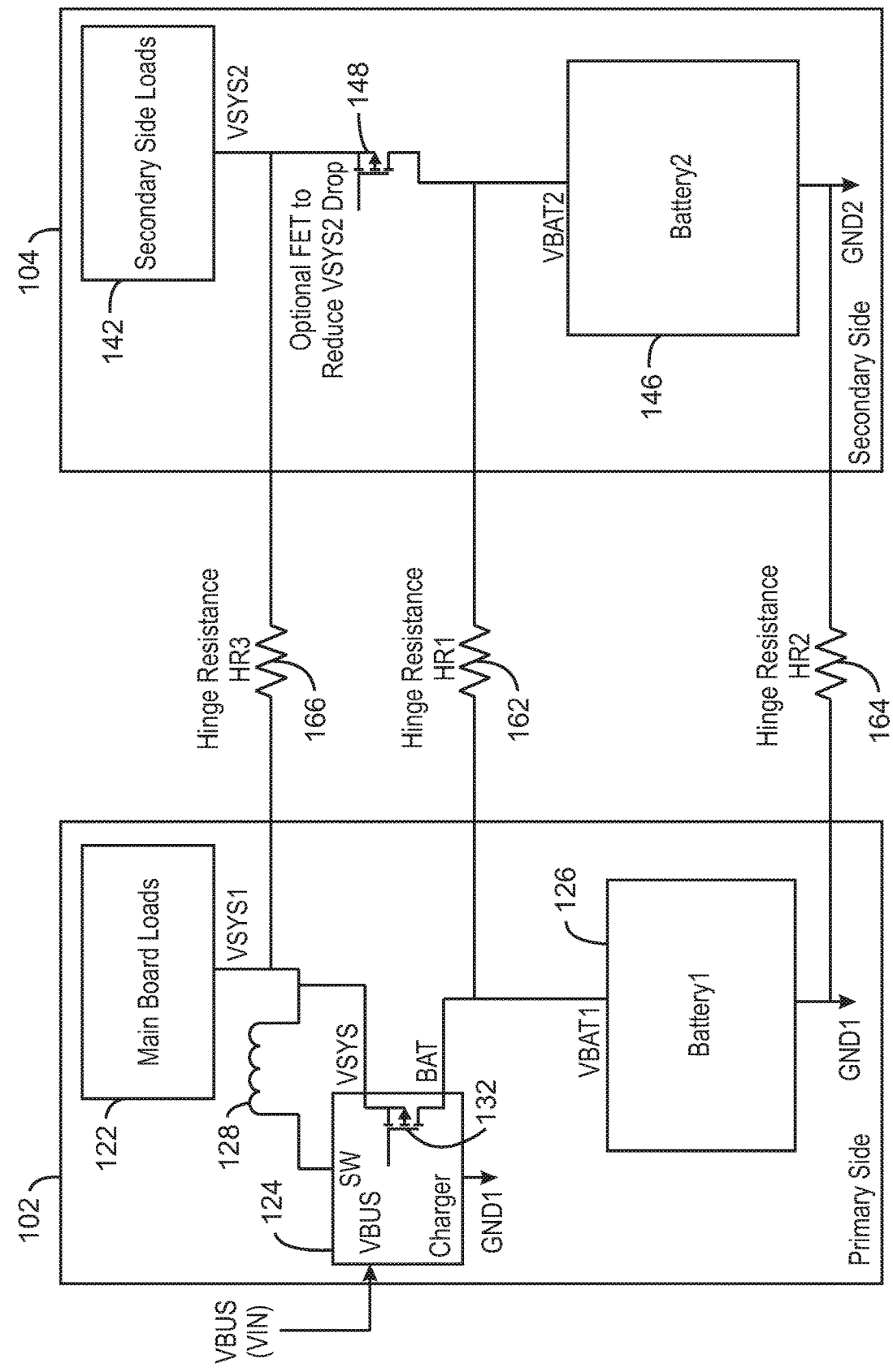
FIG. 1 illustrates a system in accordance with some embodiments.

Dual display converged mobility devices are increasingly used in mobile computing. Use of a device with dual display may require batteries on either side of the device in order to achieve battery life required to power both displays. For compact devices, a 1S2P battery configuration provides a space optimized energy management solution. A 2S configuration, dual charger approach, etc., for example, can be more complex and consume more space. Design of hinges connecting both sides mechanically and electrically can be extremely space constrained. Additionally, wires connecting the batteries in parallel can offer considerable resistance due to wire gauge limitations. To keep cost and electrical complexity under control, most printed circuit board (PCB) electronics can be placed on one side, with required electronics placed on the other side (for example, a second display, touch, audio, etc.) This can lead to asymmetric board and battery sizes and loads.

In some embodiments, a charger solution on one side (for example, the primary side or motherboard side) can be optimized, since elements such as a power management integrated circuit (PMIC) and Universal Serial Bus (USB) ports such as USB Type-C ports can be located on one side (such as the motherboard side, for example). However, when the charger is on one side, in order to run wires through to the other side in a foldable system, very thin wires may be run through the foldable portion of the device, creating hinge resistances and/or impedances due to the foldable portions and hinge resistances, for example. Due to hinge resistances and/or impedances, battery charging currents to the battery on the side with the charger and to the battery on the other side from the charger are different than expected. For example, the battery on the side with the charger may take a higher charge current than the battery on the other side without the charger. This occurs, for example, due to voltage drops across the hinge resistance, and the current that should flow to the far battery will not flow to that battery. Some of that excess current may even flow into the battery on the side with the charger (for example, the battery on the primary or motherboard side). This situation can lead to imbalanced charging. For example, the battery on the side with the charger will become fully charged while the battery on the other side is still charging. The battery on the side with the charger may then become more charged than necessary during each charging operation while waiting for the other battery to charge, which is not good for the battery that is being charged more than necessary. This is particularly troublesome in situations where the battery on the charging side is smaller, an issue in situations where the charger is on the motherboard side, for example, since batteries on the motherboard side are often smaller due to space constraints on that side of the system.

During battery discharge, since loads on the side with the charger (for example, the primary side, main board side, or motherboard side) can be much larger than on the secondary side, and also due to hinge resistances, for example, the battery on the side with the charger can be discharged much faster than the battery on the other side. The battery on the charger side may be discharged while the battery on the other side still has charge. For example, in the case of batteries with the same capacity, 10-15% of capacity may still exist on the secondary side while the capacity on the primary charger side may be close to 0%. Battery impedance imbalances may occur along with large voltage drops across the hinge resistances, which can result in system shutdowns. Also, currents on the primary charger side may be increased, and may have most of the current due to, for example, voltage drops across the hinge resistances. The battery on the other side may not be able to support a large portion of the discharge current. Therefore, in some embodiments, discharge balancing may be implemented.

FIG. 1 illustrates a system 100 that includes a primary side 102 (for example, a motherboard side) and a secondary side 104. In some embodiments, system 100 can be included in a dual display device (for example, used in mobile computing). Use of a device with dual display may require batteries on either side of the device in order to achieve battery life required to power both displays. In some embodiments, for example, the primary side 102 can be a side of the system 100 including a first display and the secondary side 104 can be a side of the system 100 including a second display (for example, system 100 can be a dual display device with displays on two different sides of the device).

Primary side 102 includes main board loads 122, charger 124, battery 126 (Battery1), and an inductor 128. Charger 124 includes a transistor 132 (for example, a field effect transistor or FET). Secondary side 104 includes secondary side loads 142, battery 146 (Battery2) and an optional field effect transistor (FET) 148. FET 148 can be used to reduce the VSYS2 voltage drop.

In some embodiments, battery 126 on the primary side 102 and battery 146 on the secondary side 104 can be 1S batteries coupled in parallel that are charged by a single charger 124 located on the primary side 102. System 100 can also include hinge resistance HR1 162 (for example, 100 mOhm), hinge resistance HR2 164 (for example, 100 mOhm), and hinge resistance HR3 166 (for example, 100 mOhm). In some embodiments, system 100 is a foldable device with the primary side 102 and the secondary side 104, where the sides can be folded relative to each other (for example, at the point of the hinge resistances).

In some embodiments, charging current driven from the charger 124 of system 100 may not be equally distributed until the battery with the higher current (either battery1 126 or battery2 146) increases its voltage due to faster charging. This can be due to an additional voltage drop in the VBAT path VBAT2 (battery voltage path) and GND path GND2 (ground voltage path) for battery 146. In system 100, battery1 126 may be smaller (for example, located on the motherboard side), and ends up taking most of the charging current at the beginning of charging. During normal discharge, battery1 126 may be at a lower state of charge due to a hinge resistance drop from battery2 146. In some embodiments, there may be a risk of over charge current trip by a protection device in battery1 126. In some embodiments, a fast charging time can considerably increase as battery1 126 reaches constant voltage (CV) earlier and battery2 146 reaches CV at a later time. In some embodiments, battery1 126 may wear out faster than battery2 146 due to exposure to higher charger currents and much lower termination currents (for example, battery1 126 reaches CV earlier). In some embodiments, fast charging time also increases due to limiting the maximum total charging current to ensure that the batteries 126 and 146 do not lock out due to high current. In some embodiments, if charger 124 input VIN is plugged out (not plugged in) during charging, both batteries 126 and 146 will be at different charging levels, and this may cause circulating currents between batteries 126 and 146. It can also limit the peak currents that the battery packs together can drive to load.

Figure 2:
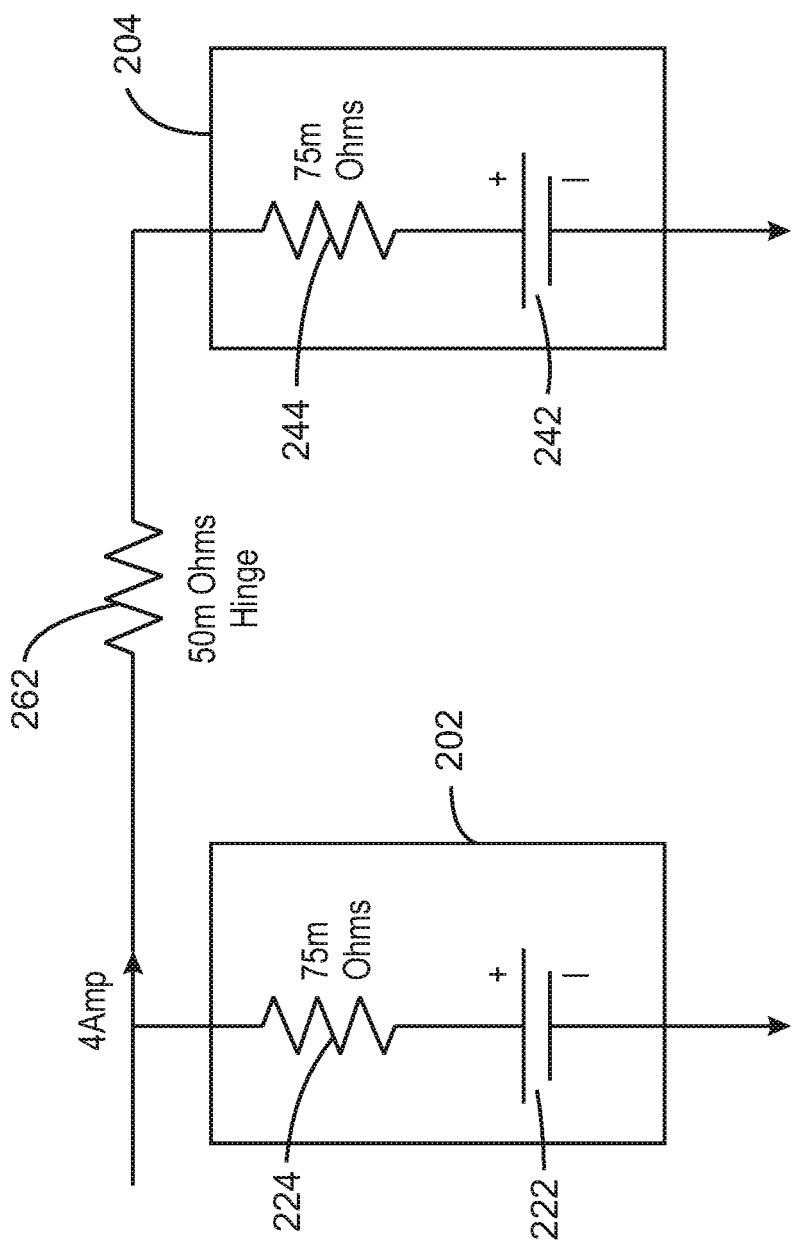
FIG. 2 illustrates a graph illustrating battery voltage and battery capacity.

FIG. 2 illustrates a system 200 with charge imbalance. System 200 includes a first battery pack 202 on the left side of FIG. 2 and a second battery pack 204 on the right side of FIG. 2. First battery pack 202 includes a battery1 (BAT1) 222 and a resistor 224 (for example, with a resistance of 75 mOhms). Second battery pack 204 includes a battery2 (BAT2) 224 and a resistor 244 (for example, with a resistance of 75 mOhms). System 200 also includes a hinge resistor 262 (for example, with a resistance of 50 mOhms).

System 200 includes a total hinge resistance of 50 mOhms, for example (VBAT and GND paths). In some embodiments, battery1 (BAT1) 222 on the left of FIG. 2 has a capacity of, for example, 1500 mAH, and battery2 (BAT2) 242 on the right of FIG. 2 has a capacity of 2500 mAH. Each of the battery packs 202 and 204 in system 200 includes, for example, an internal resistance of 75 mOhms. It is noted that both battery packs 202 and 204 may have similar resistance, where most of the resistance is due to protection circuits. In an example of system 200, a charger is driving a total charge current of 4 Amp (for example, 1C charging). Battery voltages in system 200 can be equal and well below the CV charging levels.

In some embodiments, system 200 is a foldable device with the primary side and the secondary side, where the sides can be folded relative to each other (for example, at the point of the hinge resistance 262). In some embodiments, without charge balancing, an impact occurs due to hinge resistance 262. For example, at the beginning of charging, BAT1 222 current may be 2.5 A and BAT2 242 current may be 1.5 A due to the hinge resistance drop. BAT2 242 current may be close to 1.7C (that is 1.7 times the charge current), and this may trip the maximum charge current protection of BAT1 222. This initial charge current can considerably reduce the BAT1 222 life. If normal charging still continues, after some time of charging, the charging current may become proportional to battery capacities (for example, IBAT1=1.5 A and IBAT2=2.5 A) due to self-balancing. When the voltage at the charger output is at CV (constant voltage charging) level (for example, 4.2V), the following may occur, for example: VBAT1=4.2V and VBAT2=3.89V. VBAT2 voltage may still be very far from CV voltage when VBAT1 hits CV voltage. That is, when battery2 242 hits the termination current in CV mode, battery2 242 charge current may be far below its specified termination current level. This can also impact the BAT1 222 life.

In some embodiments, in order to solve some or all of the above challenges, for example, charge currents may be equally distributed to both batteries irrespective of hinge resistance, contact resistances, and battery impedance. In some embodiments, charge current may be distributed in the same ratio as the battery capacities.

In some embodiments, an independent battery charger may be used for each battery with independent charge control of each battery. However, with independent chargers for each battery, cost and space requirements may be higher. Additionally, it may be tough to manage discharge of batteries without wasting power if one charger supplies input power to the other charger.

In some embodiments, current limiting of each battery charge current may be implemented to keep the batteries from seeing excessive charge currents. Current limiting each battery charge current may be implemented in a manner that the current may be programmed at a fixed level. This can prevent battery overcharge protection from being activated, but the charge current to each battery may not be balanced. However, fast charging time may considerably increase as the first battery reaches constant voltage (CV) earlier than the second battery, which reaches constant voltage at a later time. Additionally, one of the batteries may wear out faster due to exposure to higher charger currents and much lower termination currents.

In some embodiments, a 2S approach may be used where the batteries are wired in a 2S configuration. This can make sure that both batteries will see the same charge/discharge currents. However, with battery capacities on both side being different, charge balancing is a major challenge. Cost/space/efficiency optimized power solutions may not be available using a 2S approach.

A primary reason for improper charge current distribution can be, for example, hinge resistance, connector resistance, and/or battery impedance in VBAT and GND paths for one of the batteries (for example, battery2) from the charger. In some embodiments, a feedback controlled active device can be added in the current path of one of the batteries (for example, in the battery1 current path) that introduces a resistance in the battery current path (for example, the battery1 current path) that compensates for hinge resistance(s), connector resistance(s), and/or battery impedance(s) in another battery path (for example, in the battery2 current path).

In some embodiments, a single conventional 1S charger may be used. In some embodiments, charge current may be automatically distributed irrespective of the total current from the battery charger due to feedback control. This distribution can also be active when the current reduces in a CV mode (constant voltage mode). In some embodiments, accurate, capacity based charge current distribution may be implemented using very little extra circuit space. In some embodiments, large current flow from a secondary battery (for example, battery2) to a primary battery (for example, battery1) may be prevented during assembly by limiting the current.

Figure 3:
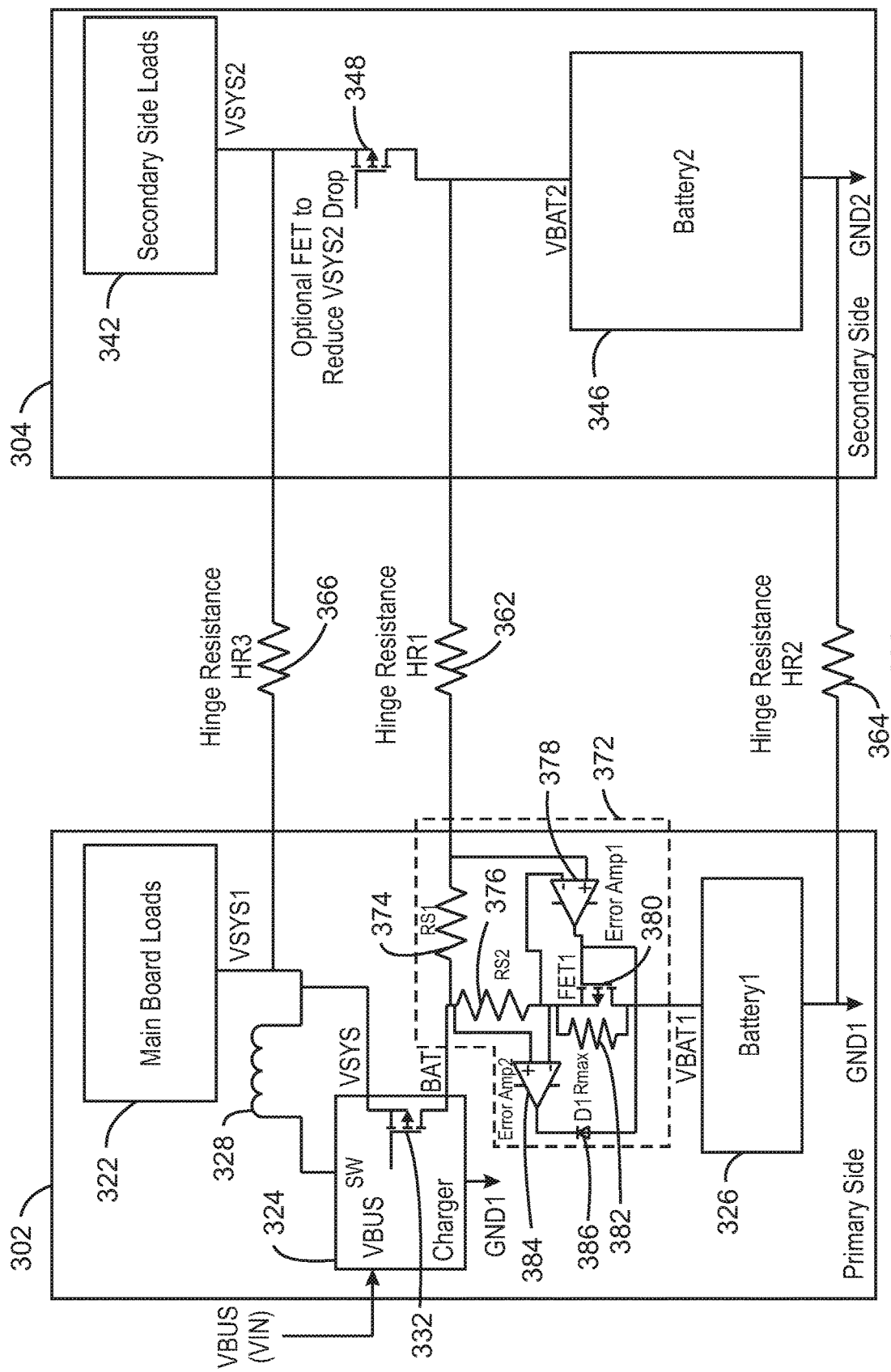
FIG. 3 illustrates a graph illustrating battery voltage and battery capacity in accordance with some embodiments.

FIG. 3 illustrates a system 300 in accordance with some embodiments. In some embodiments, system 300 includes a charge current distribution circuit. In some embodiments, the circuit within the dashed lines in FIG. 3 is a charge current distribution circuit.

In some embodiments, FIG. 3 illustrates a system 300 that includes a primary side 302 (for example, a motherboard side) and a secondary side 304. In some embodiments, system 300 can be included in a dual display device (for example, used in mobile computing). Use of a device with dual display may require batteries on either side of the device in order to achieve battery life required to power both displays. In some embodiments, for example, the primary side 302 can be a side of the system 300 including a first display and the secondary side 304 can be a side of the system 300 including a second display (for example, system 300 can be a dual display device with displays on two different sides of the device).

Primary side 302 includes main board loads 322, charger 324, battery 326 (Battery1), and an inductor 328. Charger 324 includes a transistor 332 (for example, a field effect transistor or FET). Secondary side 304 includes secondary side loads 342, battery 346 (Battery2) and an optional field effect transistor (FET) 348. FET 348 can be used to reduce the VSYS2 voltage drop.

In some embodiments, battery 326 on the primary side 302 and battery 346 on the secondary side 304 can be 1S batteries coupled in parallel that are charged by a single charger 324 located on the primary side 302. System 300 can also include hinge resistance HR1 362 (for example, 100 mOhm), hinge resistance HR2 364 (for example, 100 mOhm), and hinge resistance HR3 366 (for example, 100 mOhm). In some embodiments, system 300 is a foldable device with the primary side 302 and the secondary side 304, where the sides can be folded relative to each other (for example, at the point of the hinge resistances).

Improper charge current distribution may occur due to hinge resistance, connector resistance, and/or battery impedance. For example, improper charge current distribution may occur due to hinge resistance, connector resistance, and/or battery impedance in VBAT and GND paths from a charger to a battery (for example, in VBAT and GND paths from the charger 324 illustrated in FIG. 3 to battery2 346 illustrated in FIG. 3).

In some embodiments, a feedback controlled active device may be included in the battery1 326 current path. A feedback controlled active device included in the battery1 326 current path can compensate for hinge resistance(s), connector resistance(s), and/or battery impedance(s) in the battery2 346 path. For example, in some embodiments, system 300 includes a feedback controlled active device (for example, in some embodiments, the circuit 372 illustrated in FIG. 3 on the primary side 302 that is included in dashed lines can be a feedback controlled active device). In some embodiments, a circuit 372 such as a feedback controlled active device can be included in the battery1 326 current path and can introduce resistance in the battery1 326 current path that can compensate for hinge resistance(s), connector resistance(s), and/or battery impedance(s) in the battery2 346 current path. In some embodiments, resistors RS1 374 and/or RS2 376 are included in the feedback controlled active device 372. In some embodiments, resistor RS1 374 may have a resistance of 10 mOhm, for example. In some embodiments, resistor RS2 376 may have a resistance of 10 mOhm, for example. In some embodiments, resistor RS1 374 and/or resistor RS2 376 sense the current through each of the battery current paths. In some embodiments, an error amplifier 378 (for example, Error Amp1) and a field effect transistor 380 (FET1) can be included in the feedback controlled active device circuit 372. In some embodiments, an error amplifier (such as Error Amp1 378) can adjust FET1 380 resistance to ensure that sense resistors RS1 374 and RS2 376 drop equal voltages. This can ensure that equal currents to battery1 326 and battery2 346 (or distributed currents based on the RS1 374 and RS2 376 resistor values). In some embodiments, the circuit 372 included in the dashed lines in FIG. 3 shows some circuit elements. It is noted that additional components may be included in the system 300 (for example, within the circuit 372 illustrated by dashed lines in FIG. 3) to help provide, for example, feedback compensation, rail to rail sense, error amplifier power in dead battery mode, etc.

In some embodiments, during assembly, the secondary side 304 can be assembled after a certain amount of testing with only the battery 326 on the primary side 302. In some embodiments, the primary battery 326 can be at a lower charge level than the secondary battery 346. In some embodiments, a feedback controlled active device (for example, the circuit 372 in the dashed lines in FIG. 3) can prevent at assembly a large current flow from the battery2 346 on the secondary side 304 to the battery1 326 on the primary side 302 by limiting the current. In some embodiments, transistor FET1 380 of FIG. 3 may fully turn off during assembly, and the resistor Rmax 382 can limit the current from the secondary side battery2 346. In some embodiments, the resistance of resistor Rmax 382 is 0.2 Ohms. In some embodiments, depending on system design, the resistance of resistor Rmax 382 can be adjusted based on a desired maximum charge sharing current limit.

In some embodiments, error amplifier 2 (Error Amp2) 384 can override and make transistor FET1 380 fully on during discharge conditions. Charge balancing may only be needed during battery charging when the current through sense resistor RS1 374 and sense resistor RS2 376 are positive. In some embodiments, diode D1 386 can indicate that error amplifier 2 (Error Amp2) 384 can override error amplifier 1 (Error Amp1) 378 only for turning on transistor FET1 380 and not for turning off. In some embodiments, this logic may be implemented in different ways.

In some embodiments, system 300 includes two current sense resistors 374 and 376, a FET 380 with a bypass resistor 382, and two operational amplifiers 378 and 384. In some embodiments, battery1 326 and battery2 346 are the same size. In such a situation it is advantageous that charge currents of batteries 326 and 346 are the same. Therefore, in some embodiments, the voltage drop across resistor RS1

374 and the voltage drop across RS2 376 are the same. Therefore, in some embodiments, when the voltage drops across RS1 374 and RS2 376 are the same, the input voltage to error amplifier Amp1 378 is zero. Error amplifier Amp1 378 can control transistor FET1 380 in a linear state. However, it can add a small impedance (assistance) to make sure that an impedance from both batteries 326 and 346 to the charger 324 output will be equal.

Operational assistance for the battery voltage is generated by FET1 380 through a closed loop control controlled by error amplifier Amp1 378. In this manner the impedance through FET1 380 can be used to match the impedance at VBAT2. In some embodiments, the input to Amp1 378 is maintained at zero, and the voltage drop across RS1 374 is maintained to be the same as the voltage drop across RS2 376. This helps to maintain similar currents into battery1 326 and battery2 346, even as current to each battery varies during charging.

In some embodiments, amplifier Amp2 384 can override amplifier Amp1 378 (for example, when charging is removed and current is flowing in the opposite direction than current flow during charging. During discharge of battery1 326, for example, current may flow through transistor 332 of the charger 324 and to the VSYS node to provide power to main board loads 322, for example. During discharging, the voltage across resistor RS2 376 is reversed relative to the voltage across resistor RS2 376 during charging, and the output of error amp2 384 is zero. In this situation, D1 386 pulls FET1 380 to low to turn it fully ON. In this manner, during battery discharge, FET1 380 is fully ON and amplifier 384 overrides amplifier 378 to ensure no additional impedance (other than in RS1 374 and RS2 376) during discharge. Different arrangements are possible in different embodiments, but in some embodiments, a transistor such as FET1 380 is added at VBAT1 to match VBAT2 power.

Figure 4:
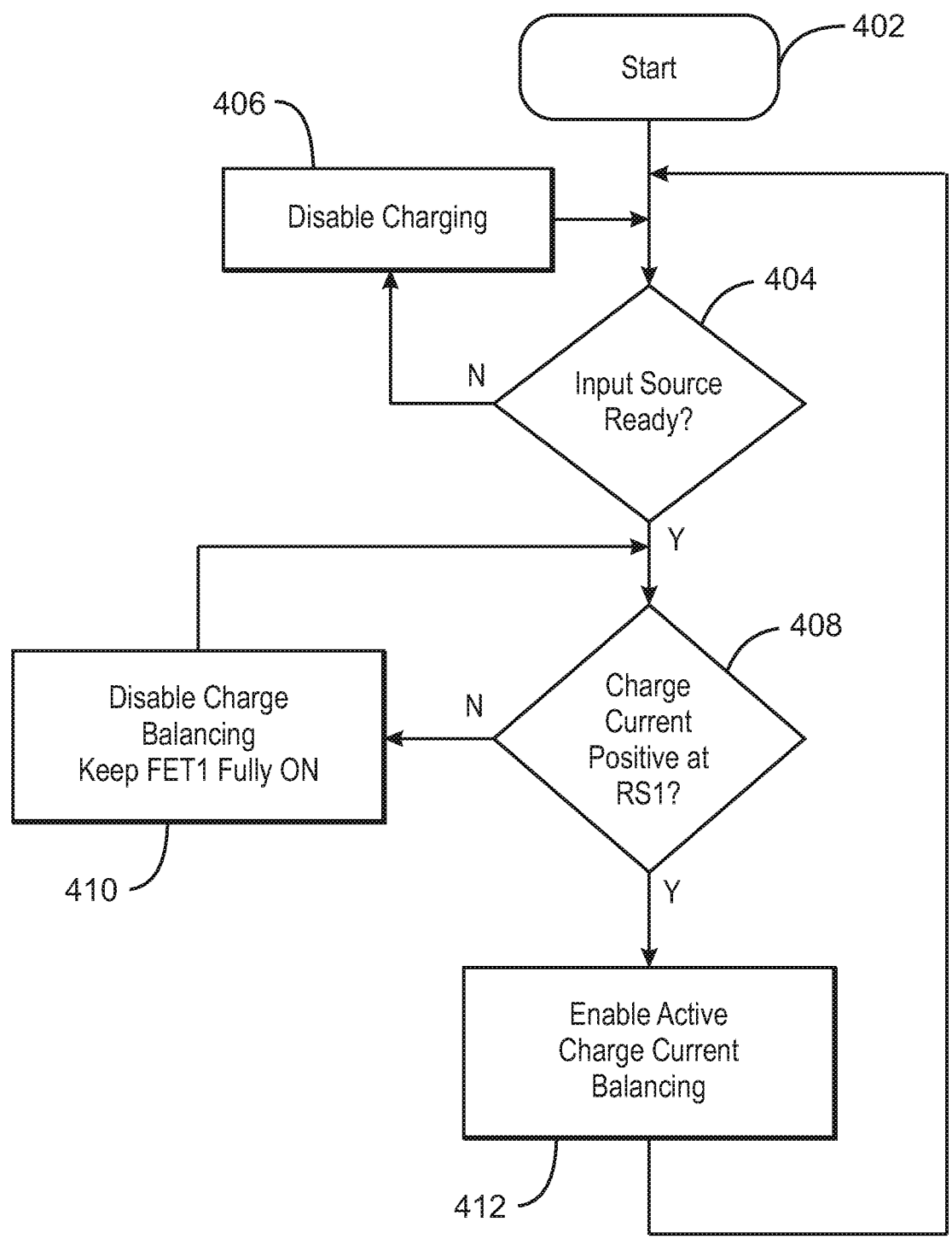
FIG. 4 illustrates battery charge termination voltage adjustment in accordance with some embodiments.

FIG. 4 illustrates flow 400 in accordance with some embodiments. In some embodiments, flow 400 implements charge current balancing. In some embodiments, flow 400 beings at 402. At 404 a determination is made as to whether an input source is ready. If an input source is not ready at 404, charging is disabled at 406 and flow returns to 404. If an input source is ready at 404, a determination is made at 408 as to whether a charge current is positive at resistor RS1 374, for example. If the charge current is not positive at 408, charge balancing is disabled at 410 (for example, FET1 378 is kept fully ON) and flow returns to 408. If the charge current is positive at 408, active charge current balancing is enabled at 412, and flow returns to 404.

In some embodiments, charge balancing 400 is enabled only when the charge current through RS1 374 is positive, for example. This can be sensed by the Error Amp2 384. Error Amp2 384 can be configured to override Error Amp1 376, or the same function can be implemented by controlling an enable input for Error Amp1 376 using an output from Error Amp2 384. It is noted that other implementations in accordance with some embodiments other than that illustrated in FIG. 3 and/or FIG. 4 can also be implemented.

In some embodiments, once the charge current to each battery is balanced, charger levels (for example, charge CV levels) can be increased to compensate for the total voltage drop from the charger output to the battery terminal. Once the state of charge is above 80%, for example, CV voltage can again be adjusted to meet the battery requirement to reduce charging time.

Figure 5:
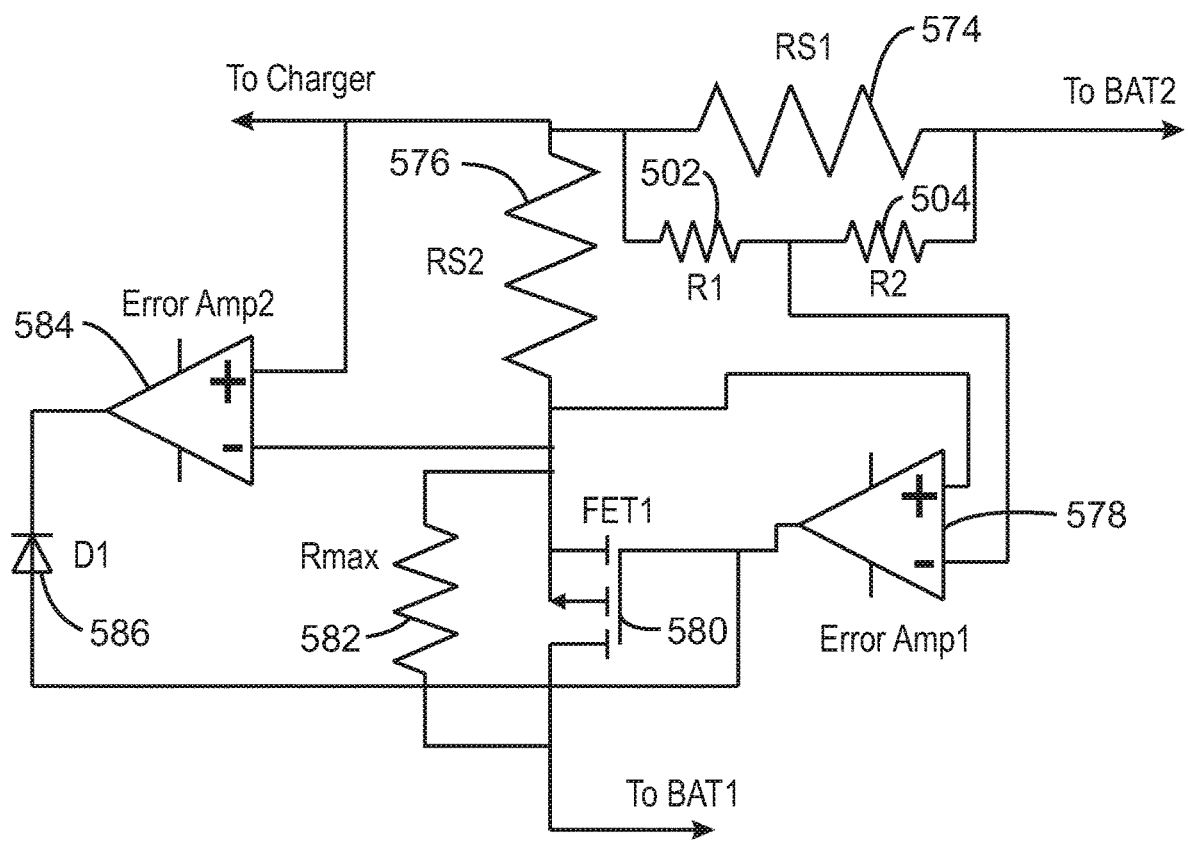
FIG. 5 illustrates a system in accordance with some embodiments.

FIG. 5 illustrates a charge current distribution circuit 500 in accordance with some embodiments. In some embodiments, charge current distribution circuit 500 can be included in system 300 (for example, in place of some or all of the circuit 372 illustrated within dashed lines in FIG. 3).

In some embodiments, charge current distribution circuit 500 is a ratio metric charge current distribution circuit. In some embodiments, charge current distribution circuit 500 can accurately balance charge current based on the battery capacity without choosing different current sense resistor values. At 10 mOhm range of sense resistance, it can be difficult to get fine resolution.

Circuit 500 includes resistor R1 502, resistor R2 504, resistor RS1 574, resistor RS2 576, error amplifier 578 (for example, Error Amp1), field effect transistor 580 (FET1), resistor Rmax 582, error amplifier 2 (Error Amp2) 584, and diode D1 586. In some embodiments, resistor RS1 574, resistor RS2 576, error amplifier 578 (for example, Error Amp1), field effect transistor 580 (FET1), resistor Rmax 582, error amplifier 2 (Error Amp2) 584, and diode D1 586 can be the same as or similar to resistor RS1 574, resistor RS2 576, error amplifier 578 (for example, Error Amp1), field effect transistor 580 (FET1), resistor Rmax 582, error amplifier 2 (Error Amp2) 584, and diode D1 586. In some embodiments, resistor RS1 374, resistor RS2 376, error amplifier 378 (for example, Error Amp1), field effect transistor 380 (FET1), resistor Rmax 382, error amplifier 2 (Error Amp2) 384, and diode D1 386, respectively. In some embodiments, circuit 500 can be used in a system in which battery2 (BAT2) is of a bigger capacity than battery1 (BAT1). However, it is noted that the circuit can be swapped in case battery1 (BAT1) is of a bigger capacity than battery2 (BAT2). In some embodiments, resistor R1 502 and resistor R2 504 of circuit 500 can divide voltage across sense resistor RS1 574. In some embodiments, a resistance of sense resistor RS1 574 can be, for example, 10 mOhm. The error amplifier 578 can adjust the currents to ensure that voltage across resistor R1 502 is equal to voltage across R2 504. In some embodiments, a ratio of the resistances of resistor R1 502 and resistor R2 504 can be adjusted to get the required results.

In some embodiments, the charge current distribution circuit within the dashed lines in system 300 and/or the charge current distribution circuit 500 can be adjusted. That is, in accordance with some embodiments, measuring the charge current to each battery and then adjusting the impedance of the active device in the battery1 path can be implemented in different ways.

In some embodiments, system 300 can be a simple solution due to the current sense on the same side. However, in accordance with some embodiments, current sense information from a fuel gauge sense resistor from the secondary side can be brought to the primary side. This may save, for example, an additional RS1 resistor and an additional voltage drop across RS1 during charge and discharge. In some embodiments, RS2 can be used for current sense for a fuel gauge (fuel gauge1) on the primary side with a positive supply current sensing fuel gauge to avoid additional voltage drop in the battery1 path.

It is noted that hinge resistance from a higher capacity secondary side battery to a primary side processor board can considerably reduce maximum currents (for example, maximum power limit currents, maximum PL4 currents, and/or maximum power limit 4 currents) that can be drawn by the system, especially when the battery state of charge is low.

In some embodiments resistor R1 502 and resistor R2 504 are added across resistor RS1 574 in circuit 372 as illustrated in FIG. 5. In some embodiment, instead of sensing the right hand side of resistor RS1 574, amplifier 578 senses the mid-point of resistor R1 502 and resistor R2 504. This implementation may be used when battery1 326 and battery2 346 are not the same size (for example, if battery1 326 is smaller than battery2 346, or if battery2 346 is smaller than battery1 326). If battery1 326 is smaller than battery2 346, for example, then the battery2 346 current needs to be higher. For example, if a capacity of battery1 326 is one unit and a capacity of battery2 346 is two units, for example, twice as much current may need to be sent to battery2 346 than the current sent to battery1 326 (for example, 2 A to battery2 346 and 1 A to battery1 326). In this situation, if the resistance of R1 502 and the resistance of R2 504 are equal, the control loop can ensure that battery2 346 can get twice the current provided to battery1 326. Resistances of R1 502 and R2 504 can be adjusted according to capacities of battery1 326 and battery2 346 to make sure that the current provided to each of the batteries 326 and 346 is equal. In an embodiment where capacities of battery1 326 and battery2 346 are equal, resistor R1 502 can be open and a resistance of R2 504 can be zero to ensure that the same currents are applied to each battery.

Figure 6:
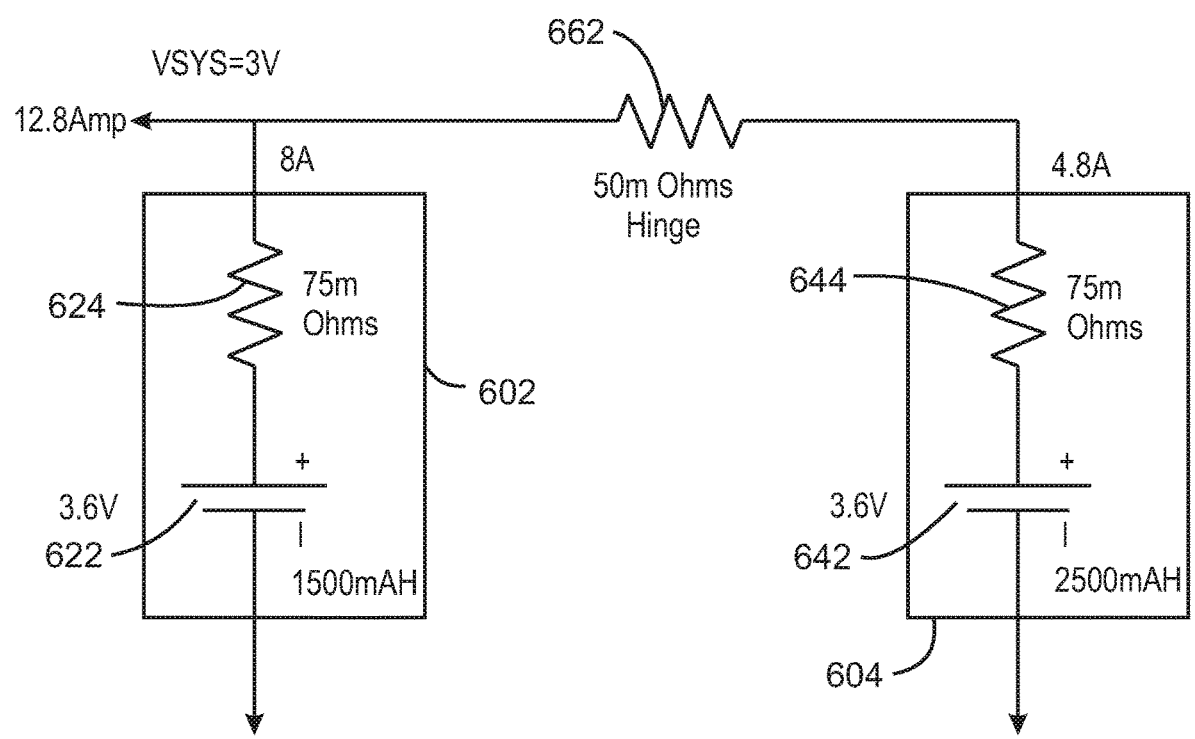
FIG. 6 illustrates a system in accordance with some embodiments.

FIG. 6 illustrates a system 600 with a first (primary side) battery pack 602 and a second (secondary side) battery pack 604. System 700 can include a total hinge resistance 662 of 50 mOhms, for example. In some embodiments, system 600 is a foldable device with the primary side and the secondary side, where the sides can be folded relative to each other (for example, at the point of the hinge resistance 662). The first battery pack 602 includes a first battery1 (BAT1) 622 and a resistor 624. The second battery pack 604 includes a second battery2 (BAT2) 642 and a resistor 644. The primary side battery 622 (for example, battery1 or BAT1) and the secondary side battery 642 (for example, battery2 or BAT2) can be connected in parallel. System 600 can include a total hinge resistance 622 of 50 mOhms, for example. In some embodiments, battery1 (BAT1) 622 on the left of FIG. 6 has a capacity of, for example, 1500 mAH, and battery2 (BAT2) 642 on the right of FIG. 6 has a capacity of 2500 mAH. In some embodiments, both batteries 622 and 642 can be lithium ion (Li ion) rechargeable type batteries. Each of the battery packs 602 and 604 in system 600 can include, for example, an internal resistance 624 and 644, respectively (for example, each with an internal resistance of 75 mOhms). In an example of system 600, if the system is trying to draw a maximum possible power with a limited minimum system voltage (for example, limited to 3V), it is possible to draw a current (for example, it is possible to draw a current of 12.8 Amp). Out of the example 12.8 Amp, 8 Amp may be contributed by the primary side battery 622 and 4.8 Amp may be contributed by the secondary side battery 642, for example.

Primary side battery current may exceed 3C limits (for example, 3 times capacity or charge current C limits such as for example, 4.5 Amp), and can cause a trip if the current lasts for too long of a time period (for example, is the current lasts for 10 ms). At the same time the system is unable to fully use the secondary side battery (for example, 3C=7.5 Amp). It is noted that 3C is used as an example limit. In some embodiments, for example, depending on the battery, other example limits may be 2C or 4C, or in a range of 2C to 4C.

Without discharge balancing, the system will have to limit total current such that the primary side battery current is, for example, less than 4.5 Amp (for example, less than 3C). Total system current might be limited to 7.2 Amp (1.8C of the total capacity). In some embodiments, turbo performance may be increased, for example, by 66% (for example, to 12 A rather than 7.2 A) with discharge balancing and proper current sharing (for example, proper 3C current sharing, or other limit current sharing). This may be implemented in a manner that is independent of the battery state of charge.

When battery impedance increases near the end of charge, turbo may be further limited due to minimum system voltage and/or due to the addition of hinge resistance.

Useful capacity issues may also occur. For example, instantaneous discharge current drawn from each battery may depend on load profile, battery impedance, hinge resistance, and/or which side to which the load is connected, etc. If the primary load is larger, primary display side battery may become empty while the secondary display side battery might still have remaining charge.

Figure 7:
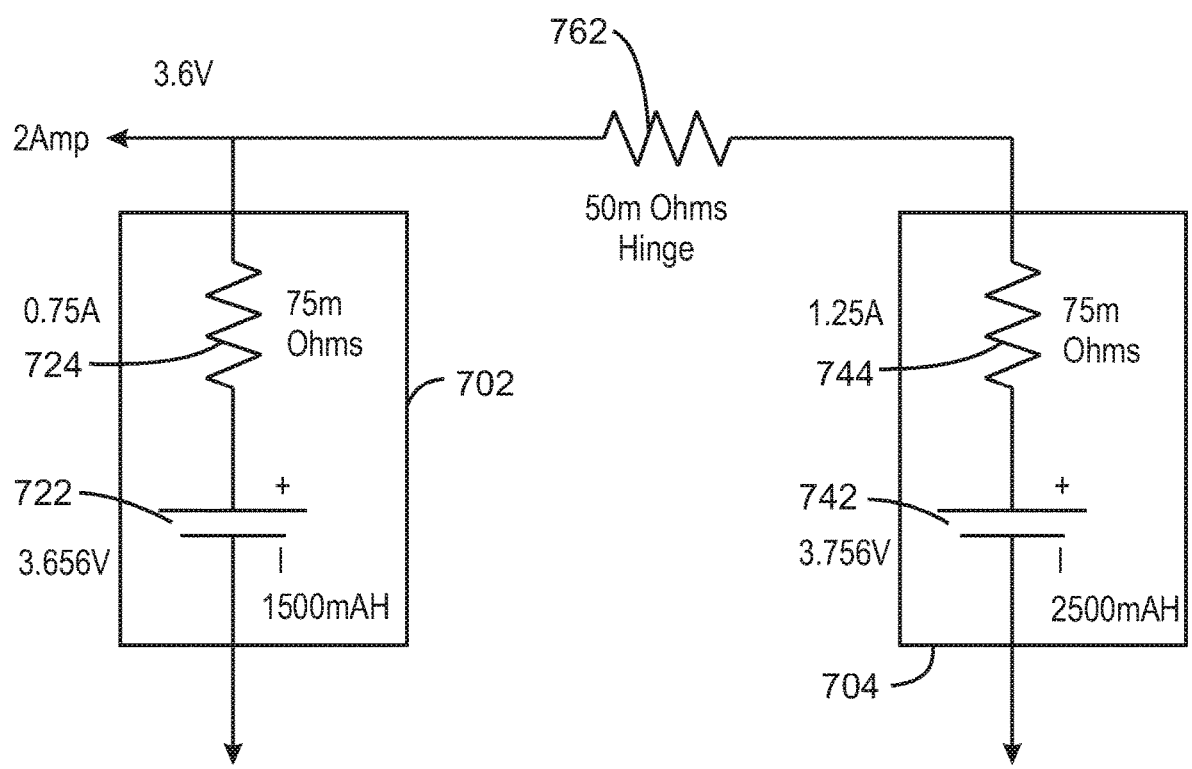
FIG. 7 illustrates a system in accordance with some embodiments.

FIG. 7 illustrates a system 700 with a first (primary side) battery pack 702 and a second (secondary side) battery pack 704. The first battery pack 702 includes a first battery1 (BAT1) 722 and a resistor 724. The second battery pack 704 includes a second battery2 (BAT2) 742 and a resistor 744. The primary side battery (for example, battery1 or BAT1) 722 and the secondary side battery (for example, battery2 or BAT2) 742 can be connected in parallel. System 700 can include a total hinge resistance 762 of 50 mOhms, for example. In some embodiments, system 700 is a foldable device with the primary side and the secondary side, where the sides can be folded relative to each other (for example, at the point of the hinge resistance 762). In some embodiments, battery1 (BAT1) 722 on the left of FIG. 7 has a capacity of, for example, 1500 mAH, and battery2 (BAT2) 742 on the right of FIG. 7 has a capacity of 2500 mAH. In some embodiments, both batteries 722 and 742 can be lithium ion (Li ion) rechargeable type batteries. Each of the battery packs 702 and 704 in system 700 can include, for example, an internal resistance 724 and 744, respectively (for example, both having an internal resistance of 75 mOhms). In an example of system 700, the system load may be 2 A total on the primary side. After some discharge time, battery currents may become proportional to the respective capacities of the batteries. Under these conditions, the battery voltage difference might be around 100 mV. A 100 mV higher voltage on the secondary side 704 may translate into a remaining charge of around 10% remaining on the secondary battery 742 when the primary battery 722 is already empty.

Battery impedance seen by the system can increase drastically when the primary side battery is fully empty and the secondary side battery still has some charge left. This can limit the possible peak load current without causing a minimum system voltage trip. Effective battery impedance seen by the load may be mostly due to the secondary battery impedance plus the hinge resistance. In order to avoid unexpected trips, the system may not discharge until this point, thereby wasting battery capacity. Depending on the hinge resistance, primary side load power, and other factors, the wasted charge may be in the 5-10% range.

If the primary display side load has periodic high currents (which is often the case for computing devices), most of it can be supplied by a primary display side battery and later replenished by a secondary display side battery. The secondary side battery can charge the primary side battery after surge current. This can increase the charge discharge cycles for the primary side battery, causing it to degrade faster. Therefore, in accordance with some embodiments, an equal distribution of discharge currents is made to both primary and secondary side batteries irrespective of hinge resistance, contact resistances, and battery impedance. In some embodiments, the discharge current is distributed in a same ratio as a ratio of battery capacities.

A dual charger approach might be used with a second charger driving the first charger input voltage (VIN), for example, through a reverse boost mode form the secondary side battery (for example, battery2). The dual charger approach may be combined with battery voltage paths (VBAT paths). In a dual charger approach, discharge from the second battery may be highly inefficient due to boosting to 5V VBUS and then buck conversion from 5V to the primary battery voltage. The secondary battery may be discharge fully first, when available, without adding special charge management control. A dual charger with combined VBAT (or VBATA) may solve the charge current balancing, but may not solve discharge current balancing. That is, performance issues may occur relating to hinge resistance from a higher capacity secondary side battery to a primary side processor board, which may considerably reduce max PL4 currents that can be drawn from the system, especially when the battery state of charge is low. Also, useful capacity issues may occur due to instantaneous discharge current drawn from each battery depending on the load profile, battery impedance, hinge resistance, and to which side the load is connected, and if the primary load is larger, a primary display side battery can become empty while the secondary display side battery still has some charge left. Further, battery life issues may occur. If the primary display side load has periodic high currents, most supply will be from the primary side battery and later replenished by the secondary side battery, and charge discharge cycles for the primary side battery may be increased, causing it to degrade faster.

Discharge current imbalance can occur due to hinge resistance, connector resistance, and/or battery impedance in the VBAT and GND paths for the secondary side battery (for example, battery2) from the charger. In accordance with some embodiments, a feedback controlled boost converter can be included in the secondary side battery path (battery2 path) that adds a series voltage in the path to compensate for voltage drops between the primary side battery (battery1) and the secondary side battery (battery2). This can include ground path drops. In some embodiments, the battery voltages are both indirectly regulated and/or tracked at the same level during discharge. When the battery voltages track each other, the discharge currents may become proportional to the battery capacities. If the feedback control loop is designed to respond fast enough battery currents can be properly shared for all practical load conditions (for example, direct current or pulsating).

In some embodiments, a single 1S charger may be used. In some embodiments, discharge current can be automatically distributed irrespective of the battery capacities. In some embodiments, better VBATA peak current may be obtained to support PL4 SOC loads due to the addition of a boost converter. In some embodiments, secondary battery currents (battery2 currents) can be increased to a maximum level, and battery voltage can be minimized as the secondary side loads are connected at the output side of the boost converter. This can allow PL4 performance until the battery is close to empty. In some embodiments, voltage tracking can enable discharge currents that are proportional to the battery capacity.

Figure 8:
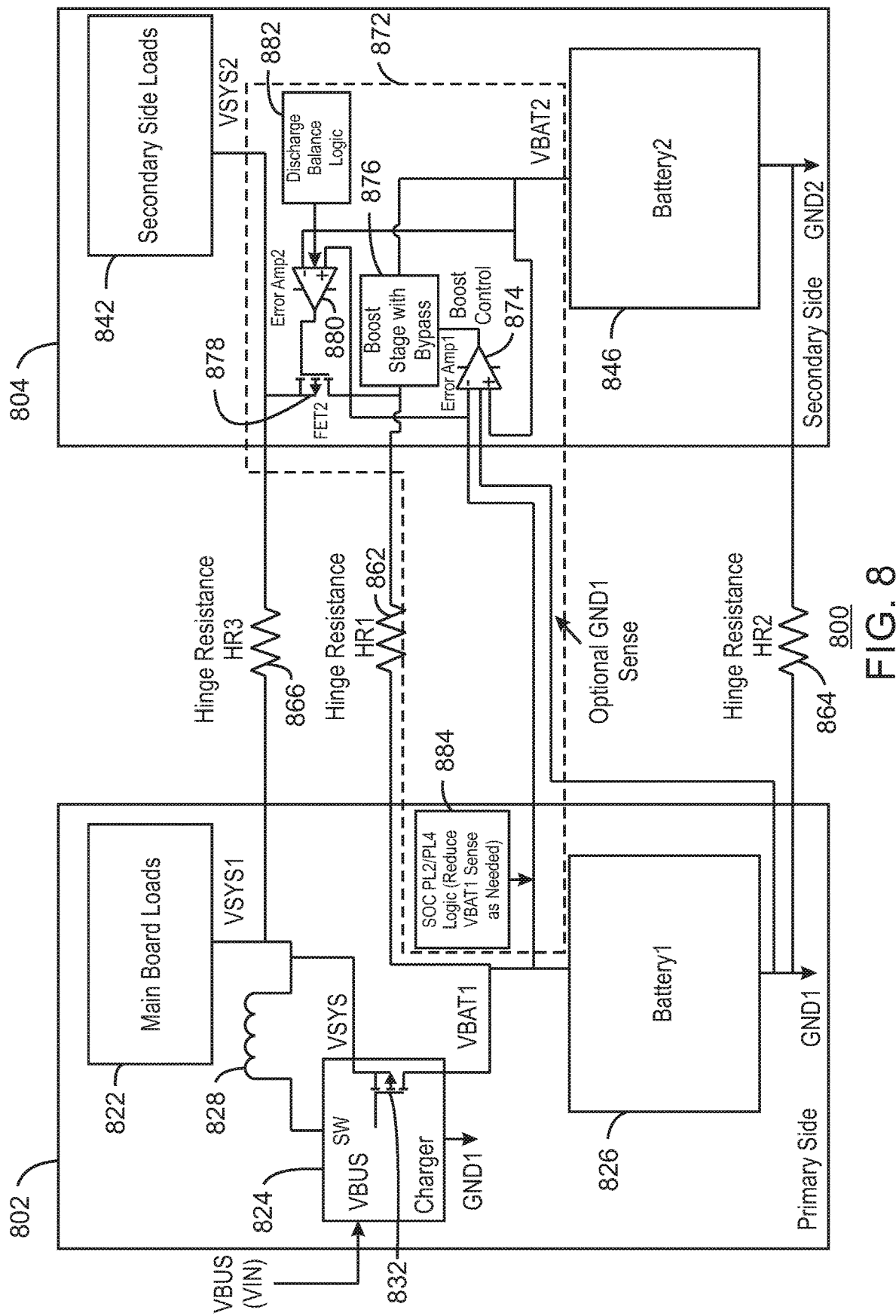
FIG. 8 illustrates a system in accordance with some embodiments.

FIG. 8 illustrates a system 800 in accordance with some embodiments. In some embodiments, FIG. 8 illustrates a system 800 that includes a primary side 802 (for example, a motherboard side) and a secondary side 804. In some embodiments, system 800 can be included in a dual display device (for example, used in mobile computing). Use of a device with dual display may require batteries on either side of the device in order to achieve battery life required to power both displays. In some embodiments, for example, the primary side 802 can be a side of the system 800 including a first display and the secondary side 804 can be a side of the system 800 including a second display (for example, system 800 can be a dual display device with displays on two different sides of the device).

Primary side 802 includes main board loads 822, charger 824, battery 826 (Battery1), and an inductor 828. Charger 824 includes a transistor 832 (for example, a field effect transistor or FET). Secondary side 804 includes secondary side loads 842 and battery 846 (Battery2).

In some embodiments, battery 826 on the primary side 802 and battery 846 on the secondary side 804 can be 1S batteries coupled in parallel that are charged by a single charger 824 located on the primary side 802. System 800 can also include hinge resistance HR1 862 (for example, 100 mOhm), hinge resistance HR2 864 (for example, 100 mOhm), and hinge resistance HR3 866 (for example, 100 mOhm). In some embodiments, system 800 is a foldable device with the primary side 802 and the secondary side 804, where the sides can be folded relative to each other (for example, at the point of the hinge resistances).

In some embodiments, system 800 includes a battery discharge balancing circuit. In some embodiments, the circuit 872 within the dashed lines in FIG. 8 is a discharge balancing circuit. In some embodiments, battery1 voltage on the primary side is sensed differentially and compared with the battery2 voltage on the secondary side using error Amp1 (error amplifier 1) 874. The compared error can include a voltage drop on the battery positive side and the ground side (GND side). A boost converter 876 (for example, boost stage plus bypass illustrated in FIG. 8) is controlled using this amplified difference in voltage. In some embodiments, the boost converter 876 can effectively adjust its duty cycle to ensure that the voltage at the output is bumped up to compensate for voltage drop in the positive and GND paths between battery1 826 and battery2 846. A control loop is used to control the voltage across the battery2 total impedance. Therefore, the loop response can be fast.

In some embodiments, if both batteries (battery1 and battery2) have equal capacity, discharge may start at the same voltages and both batteries have equal internal impedances. The boost converter and control loop can adjust until both battery impedances drop equal voltages as the control loop adjusts until VBAT1 and VBAT2 become equal. This can control the battery currents to be equal.

In some embodiments, if the batteries (battery1 and battery2) have different capacities, the batteries start at the same voltage and both batteries have equal internal impedances. The discharge current can start at the same level. The battery with the lower capacity may then deplete faster for some time, and the control loop and/or boost converter can adjust the battery currents to be proportional to battery capacities. The lower capacity battery may have to discharge to a lower level according to the following EQUATION 1:

$$\Delta V = \text{BATTimp} \times \Delta I \quad \text{(EQUATION 1)}$$

Where $\Delta V$ is an extra voltage by which the lower capacity battery needs to discharge;

Where $\Delta I$ is a difference in current to make the discharge current proportional to the battery capacity; and Where BATTimp is the total battery impedance excluding hinge resistance.

In some embodiments, combinations of battery impedances and capacities may all converge to discharge currents proportional to battery capacities at different ΔV values. The ΔV may be unavoidable in a 1S2P or 1SNP configuration, for example, if the battery impedance is not proportional to battery capacity. However, in some situations, practical values of ΔV may be small, and can be small enough to be ignored.

In some embodiments, when the hinge resistance drop is positive on the primary side and current is flowing from the primary side to the secondary side, battery discharge can be balanced by operating a FET (for example, a FET on the secondary side such as FET2 878 in FIG. 8) in the active region using a feedback loop that compares VBAT1 and VBAT2 using, for example, Error Amp2 880 of FIG. 8. In some embodiments, Error Amp2 additionally receives an input from discharge balance logic 882. When secondary side load power dominates, if FET2 878 is fully ON, battery2 846 may discharge faster. If FET2 878 is fully OFF, battery1 826 may discharge faster. By controlling current through FET2 878, it is possible to keep VBAT1 and VBAT2 at the same voltage level during discharge. In some embodiments, SOC PL2/PL4 logic 884 can be used to reduce VBAT1, for example, by sensing as needed.

As described herein, in FIG. 8, a small boost control stage may be included. The boost control can compensate for voltage drops due to hinge resistance. Battery1 826 voltage is sensed differentially by amplifier 874, and the makes sure that battery2 846 voltage is the same by controlling the boost. By using the boost, the battery is effectively placed on the other side of the hinge resistance (that is, from a system standpoint, battery2 846 will appear to be at the battery1 826 side). Any drop in voltage due to hinge resistance will be compensated by the boost stage. This can ensure that each battery discharges at the same rate (or at the same current) regardless of load differences and even during surge currents, and can maintain each battery at the same voltage level.

Figure 9:
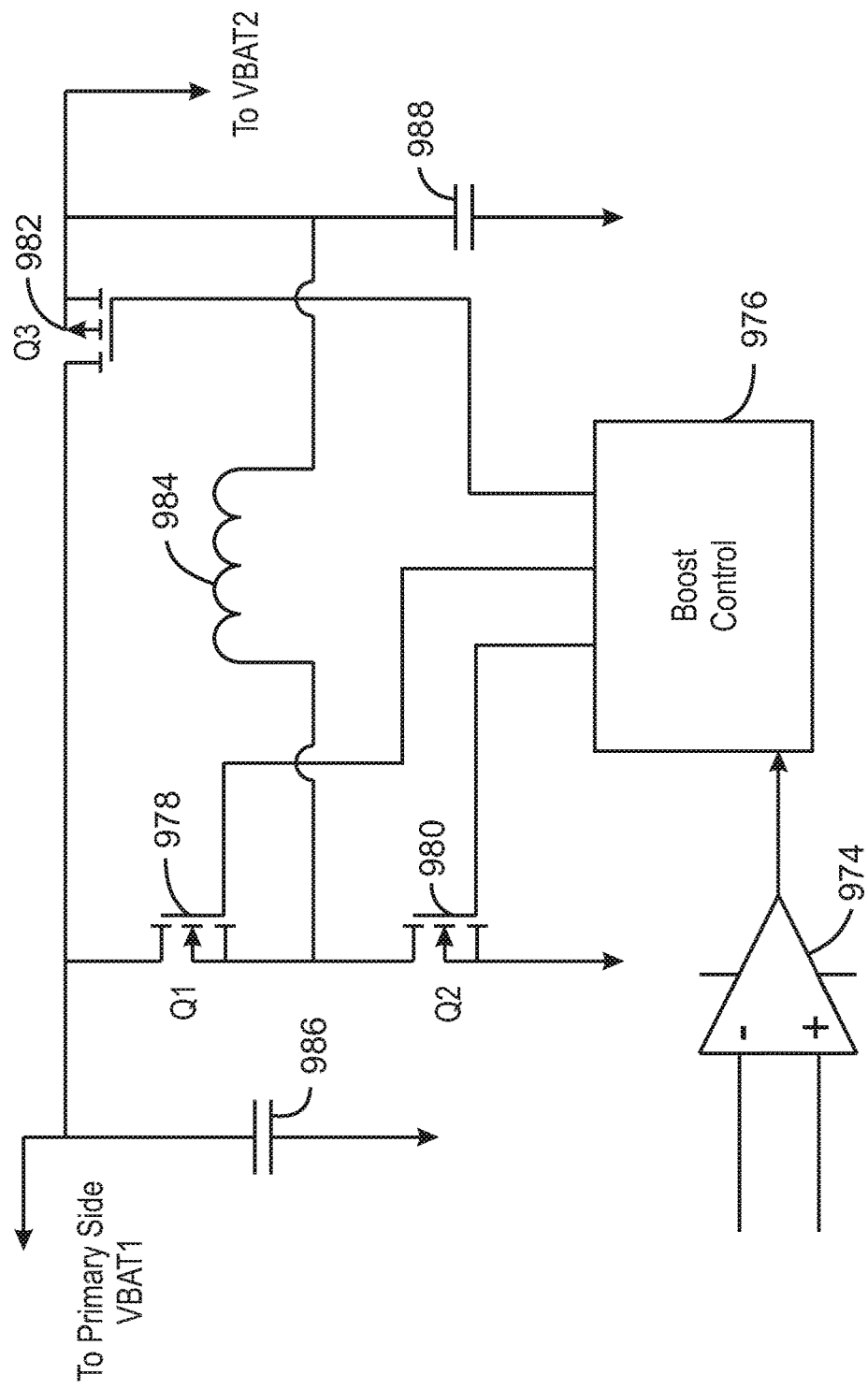
FIG. 9 illustrates a system in accordance with some embodiments.

FIG. 9 illustrates a boost converter circuit 900 in accordance with some embodiments. In some embodiments, boost converter circuit 900 can be included in system 800 (for example, in place of some or all of the circuit 872 illustrated within dashed lines in FIG. 8). Circuit 900 includes an error amplifier (Error Amp1) 974, a boost control 976, transistor Q1 978 (for example, a FET), transistor Q2 980 (for example, a FET), transistor Q3 982 (for example, a FET), an inductor 984, a capacitor 986, and a capacitor 988.

In some embodiments, the boost converter circuit 900 illustrated in FIG. 9 is a synchronous type boost converter (for example, a regular synchronous type boost converter). In some embodiments, transistors Q1 978 and Q2 980 (for example, field effect transistors Q1 and Q2 or FETs Q1 and Q2) can form a boost converter portion. In some embodiments, transistor Q3 982 (for example, field effect transistor Q3 or FET Q3) can be a bypass transistor (or bypass FET). During normal operation transistors Q1 978 and Q3 982 may be switching based on the required inductor current level for the internal loop controlled by the external voltage control loop. In some embodiments, transistor Q3 982 is a bypass transistor that can be enabled during low load current levels (for example, when the hinge resistance drop is very low and can be ignored) and during charging when the boosting function is not needed. In this manner, losses from charging and during standby can be reduced. When the discharge current is very small, the system is in a standby state, no active discharge balancing is necessary, etc., Q3 can be used to put the boost control (boost converter) to sleep and wasting energy in standby mode can be avoided.

Boost converter efficiency can be very high in normal operating modes. For example, when the total system load is 1 A (~4 W) and the secondary side is contributing 0.5 A and compensating a 100 mV drop across the total hinge resistance of 200 mOhms, boost converter efficiency can reach above 95% operating at 1 MHZ using normally sized components. Efficiency can increase further if the frequency is reduced from 1 MHz for the smaller load (for example, to 500 kHz using pulse skipping). These efficiency estimates/examples may not include losses in the hinge resistance due to voltage drops.

In some embodiments, boost converter input voltage may be controlled in a manner that does not have to compensate a right half place zero typical to boost converters. Therefore, the loop bandwidth is not limited to ⅓ of the right hand plane (RHP) zero, making the loop control fast to track pulsating load currents.

In some embodiments, the total load current on the primary side may be higher than on the secondary side, and the current through hinge resistance may flow from the secondary side to the primary side. Thus, the boost converter may only compensate for the hinge resistance voltage drop in one direction.

In some embodiments, when the hinge resistance drop is positive on the primary side and current is flowing from the primary side to the secondary side, battery discharge can be balanced by operating a FET (for example, a FET on the secondary side such as FET2 878 in FIG. 8) in the active region using a feedback loop that compares VBAT1 and VBAT2 using, for example, Error Amp2 880 of FIG. 8. When secondary side load power dominates, if FET2 878 is fully ON, battery2 may discharge faster. If FET2 878 is fully OFF, battery1 may discharge faster. By controlling current through FET2 878, it is possible to keep VBAT1 and VBAT2 at the same voltage level during discharge.

Figure 10:
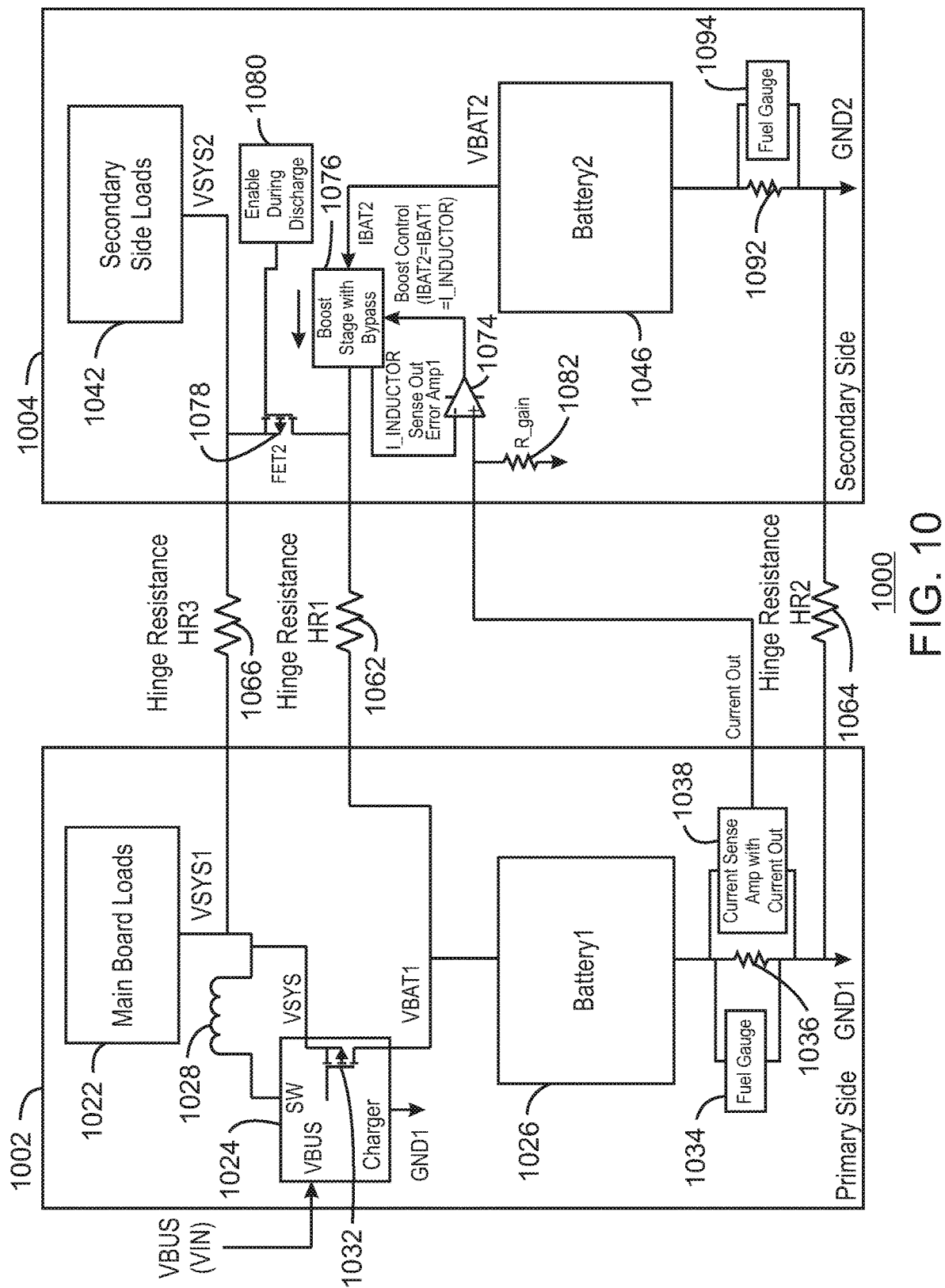
FIG. 10 illustrates a system in accordance with some embodiments.

FIG. 10 illustrates a system 1000 in accordance with some embodiments. In some embodiments, system 1000 includes a battery discharge balancing circuit.

In some embodiments, FIG. 10 illustrates a system 1000 that includes a primary side 1002 (for example, a motherboard side) and a secondary side 1004. In some embodiments, system 1000 can be included in a dual display device (for example, used in mobile computing). Use of a device with dual display may require batteries on either side of the device in order to achieve battery life required to power both displays. In some embodiments, for example, the primary side 1002 can be a side of the system 1000 including a first display and the secondary side 1004 can be a side of the system 1000 including a second display (for example, system 1000 can be a dual display device with displays on two different sides of the device).

Primary side 1002 includes main board loads 1022, charger 1024, battery 1026 (Battery1), and an inductor 1028. Charger 1024 includes a transistor 1032 (for example, a field effect transistor or FET). Secondary side 1004 includes secondary side loads 1042 and battery 1046 (Battery2).

In some embodiments, battery 1026 on the primary side 1002 and battery 1046 on the secondary side 1004 can be 1S batteries coupled in parallel that are charged by a single charger 1024 located on the primary side 1002. System 1000 can also include hinge resistance HR1 1062 (for example, 100 mOhm), hinge resistance HR2 1064 (for example, 100 mOhm), and hinge resistance HR3 1066 (for example, 100 mOhm). In some embodiments, system 1000 is a foldable device with the primary side and the secondary side, where the sides can be folded relative to each other (for example, at the point of the hinge resistances).

In some embodiments, system 1000 includes a battery discharge balancing circuit which includes one or more (or all) of a fuel gauge 1034, a sensing resistor 1036 (for example, 10 mOhm), a current sensor 1038 providing an output current ("current out"), an Error Amp1 1074, a boost converter 1076 (for example, boost stage plus bypass), a transistor (for example, a field effect transistor FET2) 1078, an enable signal 1080 for transistor 1078 (for example, an enable signal provided during battery discharge), a resistor R_gain 1082, a sensing resistor 1092 (for example, 10 mOhm), and a fuel gauge 1094.

In some embodiments, system 1000 can provide control using a boost converter configuration including boost stage with bypass 1076. In some embodiments, the battery2 1046 inductor current may be directly controlled to match measured battery1 1026 current. In some embodiments, a separate current sense amplifier 1074 may be used to sense the battery1 1026 current from the sense resistor 1036 for the fuel gauge 1034, or the fuel gauge itself can provide the output current.

In some embodiments, output current is converted to voltage with respect to GND2 on the secondary side 1004, which can remove common mode noise. The gain may be adjusted in proportion to the battery capacities using resistor R_gain 1082. In some embodiments, the average inductor current may be controlled while removing one pole from the control loop. This can significantly improve the speed of the control loop, but accurate measurement of the inductor current may be difficult.

In some embodiments, in system 1000, the battery1 current is sensed and the boost is adjusted so that the battery2 current is the same. The IBAT1 current of battery1, the IBAT2 current of battery2, and the current for the boost inductor I_INDUCTOR can all be controlled to be equal in system 1000 in embodiments where the batteries have the same capacity. However, in situations where the batteries do not have the same capacity, resistor 1082 R_gain can be adjusted to provide an asymmetric discharge of the batteries by varying their discharge currents accordingly.

Figure 11:
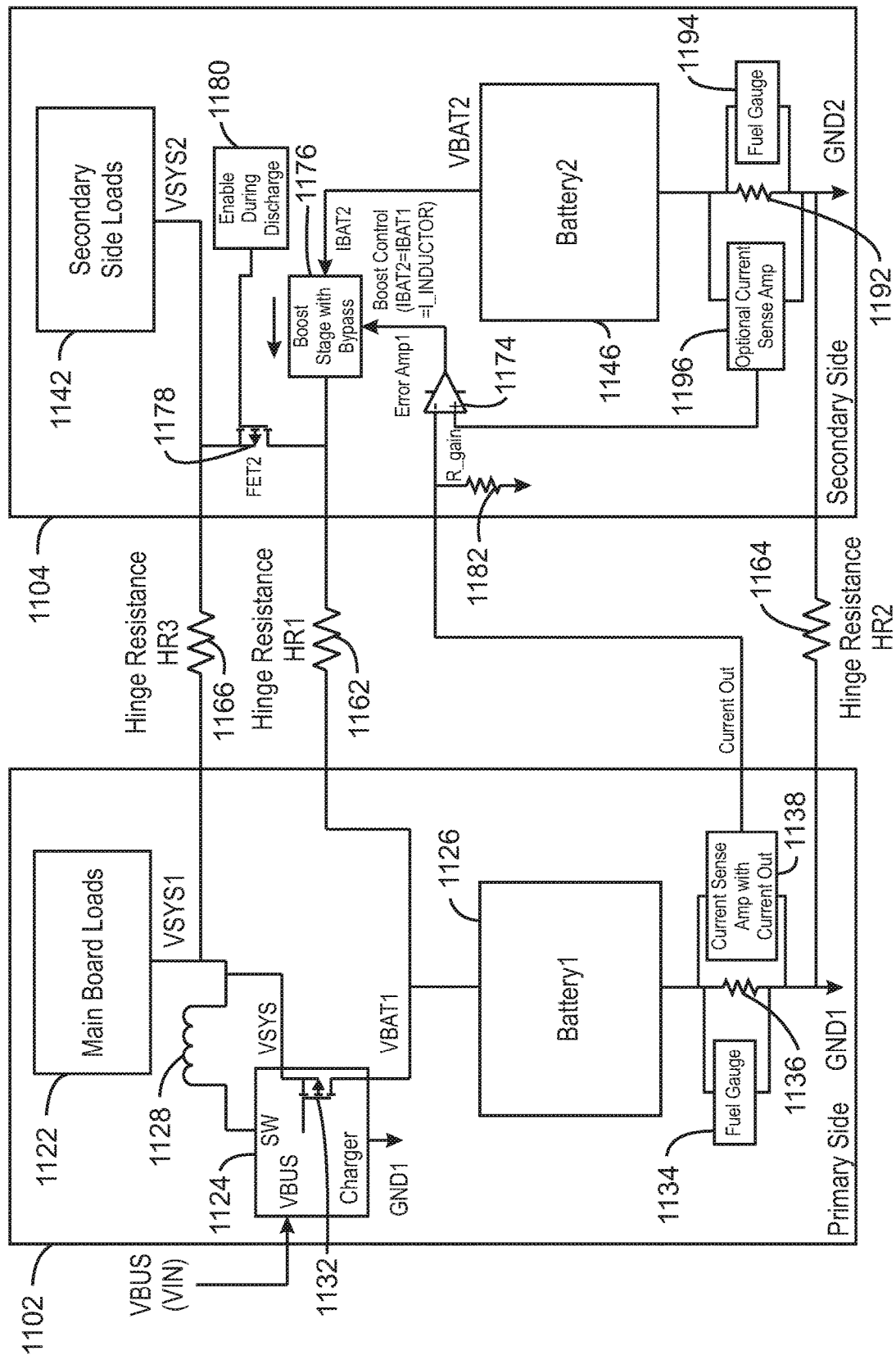
FIG. 11 illustrates a system in accordance with some embodiments.

FIG. 11 illustrates a system 1100 in accordance with some embodiments. In some embodiments, system 1100 includes a battery discharge balancing circuit.

In some embodiments, FIG. 11 illustrates a system 1100 that includes a primary side 1102 (for example, a motherboard side) and a secondary side 1104. In some embodiments, system 1100 can be included in a dual display device (for example, used in mobile computing). Use of a device with dual display may require batteries on either side of the device in order to achieve battery life required to power both displays. In some embodiments, for example, the primary side 1102 can be a side of the system 1100 including a first display and the secondary side 1104 can be a side of the system 1100 including a second display (for example, system 1100 can be a dual display device with displays on two different sides of the device).

Primary side 1102 includes main board loads 1122, charger 1124, battery 1126 (Battery1), and an inductor 1128. Charger 1124 includes a transistor 1132 (for example, a field effect transistor or FET). Secondary side 1104 includes secondary side loads 1142 and battery 1146 (Battery2).

In some embodiments, battery 1126 on the primary side 1102 and battery 1146 on the secondary side 1104 can be 1S batteries coupled in parallel that are charged by a single charger 1124 located on the primary side 1102. System 1100 can also include hinge resistance HR1 1162 (for example, 100 mOhm), hinge resistance HR2 1164 (for example, 100 mOhm), and hinge resistance HR3 1166 (for example, 100 mOhm). In some embodiments, system 1100 is a foldable device with the primary side 1102 and the secondary side 1104, where the sides can be folded relative to each other (for example, at the point of the hinge resistances).

In some embodiments, system 1100 includes a battery discharge balancing circuit which includes one or more (or all) of a fuel gauge 1134, a sensing resistor 1136 (for example, 10 mOhm), a current sensor 1138 providing an output current ("current out"), an Error Amp1 1174, a boost converter 1176 (for example, boost stage plus bypass), a transistor (for example, a field effect transistor FET2) 1178, an enable signal 1180 for transistor 1078 (for example, an enable signal provided during battery discharge), a resistor R_gain 1182, a sensing resistor 1192 (for example, 10 mOhm), a fuel gauge 1194, and/or a current sense amplifier 1196 providing an output current.

In some embodiments, system 1100 may control battery1 current and battery2 current by measuring fuel gauge sense resistor voltages (for example, fuel gauge 1134 sense resistor 1136 voltages and/or fuel gauge 1194 sense resistor 1196 voltages). In some embodiments, system 1100 may have a higher accuracy than system 1000, but a response of system 1100 may be relatively slower than a response of system 1000 due to the extra pole added by filter capacitors. However, system 1100 can still obtain response times that are fast enough to meet practical load conditions. It is noted that FIG. 10 and FIG. 11 do not illustrate additional FET2 related circuits that may be used for simplification of discharge balance in accordance with some embodiments. In some embodiments, for example, a FET2 control implementation as illustrated in FIG. 8 may be used in FIG. 10 and/or in FIG. 11 when the secondary side load is dominating, for example. This implementation may also be used in conjunction with system 1000 of FIG. 10 and/or with system 1100 of FIG. 11.

In some embodiments, if the feedback control loop is not fast enough, or if more momentary surge power is desired from the secondary battery, the VBAT1 sensed voltage may be artificially reduced using SOC control. For short durations, maximum discharge capacity of battery2 may be utilized to pump current to the primary side (for example, to support PL4 currents). When the sensed VBAT1 voltage is low, the boost converter may increase the current draw from the secondary battery (battery2) to meet the altered VBAT1 sensed voltage.

In some embodiments, secondary side loads may be connected to the output side of the boost converter (for example, in system 800, system 1000 and/or system 1100). This can make sure that there is no risk of violating minimum system voltage and unexpected trips. Thus, in some embodiments, there is no need to use one more additional control wire connection from the primary side to the secondary side to enable SOC controlled surge power supply from battery2 to the primary side. The VBAT1 sense line itself may be used to manipulate the sense voltage to enable this feature.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1

In some examples, a system includes a primary side with a charger and a first battery and a secondary side with a second battery. The first battery is to provide power to the primary side. The second battery to provide power to the secondary side. A hinge resistance is between the primary side and the secondary side. The charger is to charge the first battery and the second battery. The primary side includes a feedback controlled active device in a current path of the first battery that compensates for one or more of the hinge resistance, connector resistances, or battery impedances in a current path of the second battery.

Example 2 includes the subject matter of example 1. In example 2, the primary side includes a motherboard of the system.

Example 3 includes the subject matter of any of examples 1-2. In example 3, the first battery is to provide power to a first display of the system and the second battery is to provide power to a second display of the system.

Example 4 includes the subject matter of any of examples 1-3. In example 4, the feedback controlled active device includes a first sense resistor to sense current through a battery current path of the first battery and a second sense resistor to sense current through a battery current path of the second battery.

Example 5 includes the subject matter of any of examples 1-4. In example 5, the feedback controlled active device includes an amplifier and a transistor, the amplifier to adjust a resistance of the transistor so that voltage drops across the first sense resistor and the second sense resistor are equal during a charging of the first battery and the second battery.

Example 6 includes the subject matter of any of examples 1-5. In example 6, the transistor is a field effect transistor.

Example 7 includes the subject matter of any of examples 1-6. In example 7, the feedback controlled active device includes a second amplifier to override the first amplifier during a discharging of the first battery and the second battery.

Example 8 includes the subject matter of any of examples 1-7. In example 8, the second amplifier is to turn the transistor fully on during the discharging of the first battery and the second battery.

Example 9 includes the subject matter of any of examples 1-8. In example 9, the feedback controlled active device includes a bypass resistor across the transistor.

Example 10 includes the subject matter of any of examples 1-9. In example 10, the bypass resistor is to be adjusted based on a maximum charge sharing current limit.

Example 11 includes the subject matter of any of examples 1-10. In example 11, the feedback controlled active device includes a first resistor and a second resistor coupled in series with each other, the series connection of the first resistor and the second resistor coupled in series to be coupled in parallel with the first sense resistor, wherein resistances of the first resistor and the second resistor coupled in series with each other can be adjusted to adjust charging currents of the first battery and the second battery.

Example 12 includes the subject matter of any of examples 1-11. In example 12, the feedback controlled active device is to balance charging and discharging of the first battery and the second battery.

Example 13

In some examples, a system includes a primary side with a charger and a first battery and a secondary side with a second battery. The first battery is to provide power to the primary side. The second battery is to provide power to the secondary side. The system includes hinge resistance between the primary side and the secondary side. The charger is to charge the first battery and the second battery. The secondary side includes a feedback controlled boost converter in a current path of the second battery that compensates for voltage drops between the first battery and the second battery.

Example 14 includes the subject matter of example 13. In example 14, the primary side includes a motherboard of the system.

Example 15 includes the subject matter of any of examples 13-14. In example 15, the first battery is to provide power to a first display of the system and the second battery is to provide power to a second display of the system.

Example 16 includes the subject matter of any of examples 13-15. In example 16, the feedback controlled boost converter includes a series voltage in the current path of the second battery to compensate for voltage drops between the first battery and the second battery.

Example 17 includes the subject matter of any of examples 13-16. In example 17, the feedback controlled boost converter includes an amplifier to differentially sense a voltage of the first battery and compare it with a voltage of the second battery.

Example 18 includes the subject matter of any of examples 13-17. In example 18, the amplifier is to control the boost converter using the amplified difference in voltage.

Example 19 includes the subject matter of any of examples 13-18. In example 19, the boost converter is to adjust a duty cycle to compensate for a voltage drop between the first battery and the second battery.

Example 20 includes the subject matter of any of examples 13-19. In example 20, if a capacity of the first battery is the same as a capacity of the second battery, the feedback controlled boost converter is to discharge the first battery and the second battery at equal voltages and at equal currents.

Example 21 includes the subject matter of any of examples 13-20. In example 21, if a capacity of the first battery is not the same as a capacity of the second battery, the feedback controlled boost converter is to adjust a discharge current of the first battery and a discharge current of the second battery to be proportional to their respective battery capacities.

Example 22 includes the subject matter of any of examples 13-21. In example 22, the feedback controlled boost converter includes a current sense amplifier to sense a current of the first battery and to control the boost converter in response to the sensed current of the first battery.

Example 23 includes the subject matter of any of examples 13-22. In example 23, the feedback controlled boost converter includes a current sense amplifier to sense a current of the first battery, to sense a current of the second battery, and to control the boost converter in response to the sensed current of the first battery and the sensed current of the second battery.

Example 24 includes the subject matter of any of examples 13-23. In example 24, the feedback controlled boost converter is to maintain a discharge current of the first battery and a discharge current of the second battery to be equal.

Example 25 includes the subject matter of any of examples 13-24. In example 25, the feedback controlled boost converter is to automatically distribute discharge current to the first battery and to the second battery irrespective of battery capacities.

Example 26 In some examples, a system includes a primary side with a means for charging and a first battery, and a secondary side with a second battery. The first battery is to provide power to the primary side. The second battery is to provide power to the secondary side. A hinge resistance is between the primary side and the secondary side. The means for charging is to charge the first battery and the second battery. The primary side includes a means for controlling feedback in a current path of the first battery including means for compensating for one or more of the hinge resistance, connector resistances, or battery impedances in a current path of the second battery.

Example 27 includes the subject matter of example 26. In example 27, the primary side includes a motherboard of the system.

Example 28 includes the subject matter of any of examples 26-27. In example 28, the first battery is to provide power to a first display of the system and the second battery is to provide power to a second display of the system.

Example 29 includes the subject matter of any of examples 26-28. In example 29, the feedback controlled active device includes a first means for sensing current through a battery current path of the first battery and a second sense resistor to sense current through a battery current path of the second battery.

Example 30 includes the subject matter of any of examples 26-29. In example 30, the feedback controlled active device includes means for amplifying and a transistor, the means for amplifying to adjust a resistance of the transistor so that voltage drops across the first sense resistor and the second sense resistor are equal during a charging of the first battery and the second battery.

Example 31 includes the subject matter of any of examples 26-30. In example 31, the transistor is a field effect transistor.

Example 32 includes the subject matter of any of examples 26-31. In example 32, the means for controlling feedback includes a second amplifier to override the first amplifier during a discharging of the first battery and the second battery.

Example 33 includes the subject matter of any of examples 26-32. In example 33, the second amplifier is to turn the transistor fully on during the discharging of the first battery and the second battery.

Example 34 includes the subject matter of any of examples 26-33. In example 34, the means for controlling feedback includes a bypass resistor across the transistor.

Example 35 includes the subject matter of any of examples 26-34. In example 35, including means for adjusting the bypass resistor based on a maximum charge sharing current limit.

Example 36 includes the subject matter of any of examples 26-35. In example 36, the means for controlling feedback including a first resistor and a second resistor coupled in series with each other, the series connection of the first resistor and the second resistor coupled in series to be coupled in parallel with the first sense resistor, wherein resistances of the first resistor and the second resistor coupled in series with each other can be adjusted to adjust charging currents of the first battery and the second battery.

Example 37 includes the subject matter of any of examples 26-36. In example 37, the means for controlling feedback including means for balancing charging and discharging of the first battery and the second battery.

Example 38 In some examples, a system includes a primary side with means for charging and a first battery, and a secondary side with a second battery. The first battery is to provide power to the primary side. The second battery is to provide power to the secondary side. The system includes hinge resistance between the primary side and the secondary side. The means for charging is to charge the first battery and the second battery. The secondary side includes a boost converting means for controlling feedback in a current path of the second battery that compensates for voltage drops between the first battery and the second battery.

Example 39 includes the subject matter of example 38. In example 39, the primary side includes a motherboard of the system.

Example 40 includes the subject matter of any of examples 38-39. In example 40, the first battery is to provide power to a first display of the system and the second battery is to provide power to a second display of the system.

Example 41 includes the subject matter of any of examples 38-40. In example 41, the boost converting means for controlling feedback including a series voltage in the current path of the second battery to compensate for voltage drops between the first battery and the second battery.

Example 42 includes the subject matter of any of examples 38-41. In example 42, the boost converting means for controlling feedback including means for amplifying to differentially sense a voltage of the first battery and compare it with a voltage of the second battery.

Example 43 includes the subject matter of any of examples 38-42. In example 42, the amplifier is to control the boost converter using the amplified difference in voltage.

Example 44 includes the subject matter of any of examples 38-43. In example 43, including means for adjusting a duty cycle to compensate for a voltage drop between the first battery and the second battery.

Example 45 includes the subject matter of any of examples 38-44. In example 45, if a capacity of the first battery is the same as a capacity of the second battery, including means for discharging the first battery and the second battery at equal voltages and at equal currents.

Example 46 includes the subject matter of any of examples 38-45. In example 46, if a capacity of the first battery is not the same as a capacity of the second battery, means for adjusting a discharge current of the first battery and a discharge current of the second battery to be proportional to their respective battery capacities.

Example 47 includes the subject matter of any of examples 38-46. In example 47, wherein the boost converting means for controlling feedback includes a current sense amplifier to sense a current of the first battery and to control the boost converter in response to the sensed current of the first battery.

Example 48 includes the subject matter of any of examples 38-47. In example 48, the boost converting means for controlling feedback includes a current sense amplifier to sense a current of the first battery, to sense a current of the second battery, and to control the boost converting means in response to the sensed current of the first battery and the sensed current of the second battery.

Example 49 includes the subject matter of any of examples 38-48. In example 48, including means for maintaining a discharge current of the first battery and a discharge current of the second battery to be equal.

Example 50 includes the subject matter of any of examples 38-49. In example 50, including means for automatically distributing discharge current to the first battery and to the second battery irrespective of battery capacities.

Example 51 In some examples, a primary side includes a charger and a first battery and a secondary side includes a second battery. A hinge resistance is between the primary side and the secondary side. The primary side includes a feedback controlled active device in a current path of the first battery that compensates for the hinge resistance, for connector resistances, or for battery impedances in a current path of the second battery.

Example 52 In some examples, a primary side includes a charger and a first battery and a secondary side includes a second battery. A hinge resistance is between the primary side and the secondary side. The secondary side includes a feedback controlled boost converter in a current path of the second battery that compensates for voltage drops between the first battery and the second battery.

Example 53 In some examples, an apparatus including means to perform a method or realize an apparatus as in any other example.

Example 54 In some examples, machine-readable storage including machine-readable instructions, when executed, to implement a method or realize an apparatus as in any other example.

Example 55 In some examples, one or more machine readable medium including code, when executed, to cause a machine to perform the method or realize an apparatus of any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A system comprising:
a primary side comprising a charger and a first battery, the first battery to provide power to the primary side;
a secondary side comprising a second battery, the second battery to provide power to the secondary side; and
hinge resistance between the primary side and the secondary side;
wherein the charger is to charge the first battery and the second battery; and
wherein the primary side includes a feedback-controlled active device in a current path of the first battery that compensates for one or more of the hinge resistances, connector resistances, or battery impedances in a current path of the second battery, the feedback-controlled active device including:
a first sense resistor to sense current through a battery current path of the first battery;
a second sense resistor to sense current through a battery current path of the second battery;
a transistor; and
an amplifier to adjust a resistance of the transistor so that voltage drops across the first sense resistor and the second sense resistor are equal during a charging of the first battery and the second battery.

2. The system of claim 1, wherein the primary side comprises a motherboard of the system.

3. The system of claim 1, wherein the first battery is to provide power to a first display of the system and the second battery is to provide power to a second display of the system.

4. The system of claim 1, wherein the transistor is a field effect transistor.

5. The system of claim 1, wherein the feedback-controlled active device including a second amplifier to override the first amplifier during a discharging of the first battery and the second battery.

6. The system of claim 5, wherein the second amplifier is to turn the transistor fully on during the discharging of the first battery and the second battery.

7. The system of claim 1, wherein the feedback-controlled active device including a bypass resistor across the transistor.

8. The system of claim 7, wherein the bypass resistor is to be adjusted based on a maximum charge sharing current limit.

9. The system of claim 1, wherein the feedback-controlled active device including a first resistor and a second resistor coupled in series with each other, the first resistor and the second resistor coupled in series to be coupled in parallel with the first sense resistor, and wherein resistances of the first resistor and the second resistor coupled in series with each other can be adjusted to adjust charging currents of the first battery and the second battery.

10. The system of claim 1, wherein the feedback controlled active device to balance charging and discharging of the first battery and the second battery.

11. A system comprising:
a primary side comprising a charger and a first battery, the first battery to provide power to the primary side;
a secondary side comprising a second battery, the second battery to provide power to the secondary side; and
hinge resistance between the primary side and the secondary side;
wherein the charger is to charge the first battery and the second battery; and
wherein the secondary side includes a feedback-controlled boost converter in a current path of the second battery that compensates for voltage drops between the first battery and the second battery, the feedback-controlled boost converter including an amplifier to differentially sense a voltage of the first battery and compare it with a voltage of the second battery.

12. The system of claim 11, wherein the primary side comprises a motherboard of the system.

13. The system of claim 12, wherein the first battery is to provide power to a first display of the system and the second battery is to provide power to a second display of the system.

14. The system of claim 11, wherein the feedback-controlled boost converter including a series voltage in the current path of the second battery to compensate for voltage drops between the first battery and the second battery.

15. The system of claim 11, wherein the amplifier to control the boost converter using an amplified difference in voltage.

16. The system of claim 15, wherein the boost converter to adjust a duty cycle to compensate for a voltage drop between the first battery and the second battery.

17. The system of claim 11, wherein if a capacity of the first battery is same as a capacity of the second battery, the feedback-controlled boost converter is to discharge the first battery and the second battery at equal voltages and at equal currents.

18. The system of claim 11, wherein if a capacity of the first battery is not same as a capacity of the second battery, the feedback-controlled boost converter to adjust a discharge current of the first battery and a discharge current of the second battery to be proportional to their respective battery capacities.

19. The system of claim 11, wherein the feedback-controlled boost converter is to automatically distribute discharge current to the first battery and to the second battery irrespective of battery capacities.

20. A system comprising:
a primary side comprising a charger and a first battery, the first battery to provide power to the primary side;
a secondary side comprising a second battery, the second battery to provide power to the secondary side; and
hinge resistance between the primary side and the secondary side;
wherein the charger is to charge the first battery and the second battery; and
wherein the secondary side includes a feedback-controlled boost converter in a current path of the second battery that compensates for voltage drops between the first battery and the second battery, the feedback-controlled boost converter including a current sense amplifier to sense a current of the first battery and to control the boost converter in response to the sensed current of the first battery.

21. The system of claim 20, the current sense amplifier to sense a current of the second battery, and to control the boost converter in response to the sensed current of the second battery.

22. The system of claim 21, wherein the feedback-controlled boost converter is to maintain a discharge current of the first battery and a discharge current of the second battery to be equal.

* * * * *